April 17, 1928.
T. R. COOK
1,666,368
JOURNAL BOX, BEARING, WHEEL, AND AXLE ASSEMBLY
Filed March 28, 1927
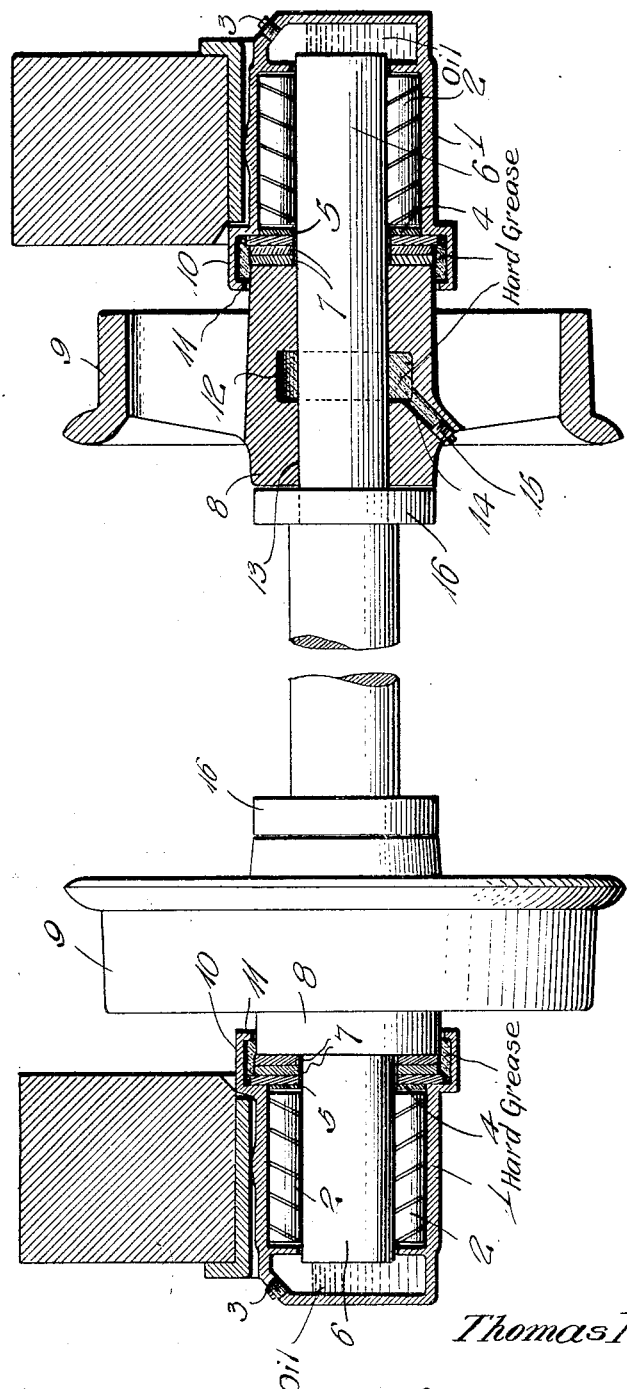
Witness
Inventor
Thomas R. Cook
By
Attorneys Patented Apr. 17, 1928.

1,666,368

UNITED STATES PATENT OFFICE.

THOMAS R. COOK, OF SCRANTON, PENNSYLVANIA, ASSIGNOR TO THE HUDSON COAL COMPANY, OF SCRANTON, PENNSYLVANIA.

JOURNAL BOX, BEARING, WHEEL, AND AXLE ASSEMBLY.

Application filed March 28, 1927. Serial No. 179,016.

The invention is intended primarily for use with mine cars, and its object is to provide a new and improved assemblage of journal box, oil-lubricated bearing, axle, and grease-lubricated wheel, in which some of the grease which is forced into a recess in the wheel to lubricate the latter and the axle, creeps along said axle into a shroud on the journal box, this grease serving to lubricate thrust means within the shroud, acting to exclude foreign matter and serving to prevent escape of oil which would otherwise find its way from the journal box along the axle.

With the foregoing in view, the invention resides in the novel subject matter hereinafter described and claimed, reference being made to the accompanying drawing in which a sectional view, partly in elevation, is illustrated.

In the drawing above briefly described, the numeral 1 designates a journal box of known construction, said box containing a bearing 2, and being provided with a removable plug 3 for the introduction of oil to lubricate the bearing. The inner end of the journal box 1 is provided with a suitable closure 4 having an opening 5 through which the axle 6 enters the box. Thrust washers 7 contact with this inner end of the journal box and while one of these washers is usually held against rotation, the others are free to rotate. The washers 7 also abut one end of the hub 8 of the wheel 9, and said washers and the adjacent portion of the hub 8, are surrounded by an annular shroud 10 formed on the inner end of the journal box 1, this shroud being outwardly spaced from the hub, but at its outer end, that is the end remote from the major portion of the journal box, being provided with a continuous flange 11 which projects inwardly to the periphery of said hub.

The hub 8 is rotatable upon the axle 6 and is provided with a recess 12 communicating with its axle-receiving bore 13. A passage 14 is formed in the hub for the purpose of forcing hard grease into the recess 12, said passage being normally closed by a plug 15. This grease serves not only to lubricate the contacting portions of the hub and axle, but performs another function to be hereinafter explained.

The end of the hub 8 remote from the journal box 1, preferably abuts a collar 16 which is stationarily mounted upon the axle in any desired manner, and it will be understood that when wear has taken place, one or more washers may be inserted between said collar and hub, and that washers of desired thickness may be added to those previously referred to, by the use of the reference character 7.

Some of the grease forced into the recess 12 creeps along the axle 6, outwardly between the washers 7 and into the shroud 10. This grease thus serves to lubricate the washers and the parts with which they contact and moreover, this grease acts to pack the shroud 10 against entrance of foregn matter. Also, by having the shroud packed with hard grease in this manner, oil is prevented from creeping along the axle, out of the journal box 1 and hence loss of oil by leakage is prevented. The rotating washers tend to move some of the grease outwardly by centrifugal force which is contrary to the direction which foreign matter must take to enter the journal box and bearing, and hence all such matter is effectively excluded.

I am aware that it is not new in the art to employ lubricated journal box bearings, that the use of the thrust washers 7 is not new, and that wheels rotatable upon the axle have heretofore been used. However, the unique assembly of parts, whereby the grease from the lubricating recess of the wheel hub prevents the entrance of foreign matter into the bearing and also prevents the loss of lubricating oil therefrom, is new in so far as I am advised, and it is this organization of parts which constitutes the gist of my invention.

I claim:

An assemblage of the class described comprising a journal box having an oil-filled reservoir and a bearing supplied with oil from said reservoir, an axle extending into said journal box and bearing, thrust means on the axle abutting one end of the journal box, a wheel whose hub is loose on the axle and abuts said thrust means, the aforesaid end of said journal box being provided with a shroud which surrounds the aforesaid thrust means and the adjacent end of said hub, said hub having a recess in communication with its interior, and a hard grease filling in said recess, said hard grease filling serving not only to lubricate the hub and axle but being adapted to creep out of the hub into the aforesaid shroud to lubricate the aforesaid thrust means, to pack said shroud against entrance of foreign matter and to prevent leakage of oil from the journal box along the axle.

In testimony whereof I have hereunto affixed my signature.

THOMAS R. COOK.